United States Patent [19]

Konishi

[11] Patent Number: 4,725,897
[45] Date of Patent: Feb. 16, 1988

[54] SOUND RECORDING SYSTEM FOR ELECTRONIC STILL CAMERA

[75] Inventor: Masahiro Konishi, Kanagawa, Japan

[73] Assignee: Fuji Photo Film Co., Ltd., Kanagawa, Japan

[21] Appl. No.: 906,587

[22] Filed: Sep. 9, 1986

Related U.S. Application Data

[63] Continuation of Ser. No. 518,482, Jul. 29, 1983, abandoned.

[30] Foreign Application Priority Data

Aug. 17, 1982 [JP] Japan ................... 57-141629

[51] Int. Cl.$^4$ ............................ H04N 5/781
[52] U.S. Cl. ................... 360/10.1; 360/35.1; 358/341; 358/906
[58] Field of Search ............... 358/341, 312, 310, 906, 358/909; 360/10.1, 11.1, 19.1, 35.1

[56] References Cited

U.S. PATENT DOCUMENTS

| | | | |
|---|---|---|---|
| 3,789,137 | 1/1974 | Newell | 360/8 |
| 4,009,331 | 2/1977 | Goldmark et al. | 360/19.1 X |
| 4,065,794 | 12/1977 | Shutterly | 360/19.1 |
| 4,065,795 | 12/1977 | Shutterly | 360/19.1 |
| 4,175,270 | 11/1979 | Zengefilis | 360/19.1 X |
| 4,286,281 | 8/1981 | Suyuki | 358/319 |
| 4,366,501 | 12/1982 | Tsunekawa et al. | 358/906 |
| 4,463,387 | 7/1984 | Hashimoto et al. | 358/341 X |
| 4,531,161 | 7/1985 | Murakoshi | 360/10.1 |
| 4,602,296 | 7/1986 | Murakoshi | 360/10.1 |

FOREIGN PATENT DOCUMENTS

| | | | |
|---|---|---|---|
| 2916387 | 10/1979 | Fed. Rep. of Germany | 358/906 |
| 57-65077 | 4/1982 | Japan | 358/310 |

*Primary Examiner*—Aristotelis M. Psitos
*Attorney, Agent, or Firm*—Birch, Stewart, Kolasch, & Birch

[57] ABSTRACT

A sound recording system for an electronic still camera records video signals indicative of still pictures time-serially in a rotary magnetic recording medium. An audio signal having a duration equal to a first period of time is compressed in the time axis into an audio signal having a duration equal to a second period of time, which is shorter than the first. The compressed audio signal is written into the recording medium as a unit record of data. Such a time-axis compression and recording cycle is repeated to record audio signals in the recording medium as discrete unit record data, in association with the video signals recorded.

16 Claims, 6 Drawing Figures

SOUND RECORDING SYSTEM FOR ELECTRONIC STILL CAMERA

This application is a continuation of application Ser. No. 518,482 filed on July 29, 1983 and now abandoned.

BACKGROUND OF THE INVENTION

1. Field of the Invention

The present invention generally relates to a sound recording system and, more particularly, to one for use with an electronic still camera.

2. Description of the Prior Art

Recently, an electronic still camera has been developed which uses a solid state image pickup device such as a charge coupled device (CCD) and a small size magnetic recording medium such as a magnetic disc. Pictures picked up by this type of camera are stored in a magnetic recording medium in the form of video signals which will adapt themselves to a television system and, therefore, such pictures are suitable for display as still pictures on a cathode ray tube (CRT) or like soft copy display device or for production of hard copies by an ink jet printer or an electrophotographic recorder using a laser beam, for example.

In reproducing the images in soft copies or hard copies, one may desire to hear sound associated with the images which may be narration or music. Further, in shooting a scene, one may desire to record sound occurring therein and to reproduce it together with the picture during playback. These demands cannot be met, however, unless an effective method is utilized to overcome the dilemma created by the fact that sound has to be reproduced dynamically during playback with respect to time, while a picture is frozen to the instant of the shot.

Narration or music may be postrecorded in association with video signals. Concerning sound in a shooting situation, however, a problem exists in recording it in association with the shot. For instance, should a recording system of the device be triggered upon depression of a release button of the camera, only the sound produced after the shot could be recorded. Recording sound both before and after a shot will naturally enhance the presence during playback of the picture. Still, this is unachievable without holding the device in a constant recording state due to the fact that the time when the release button will be depressed is always uncertain. The constant recording state would not only consume the recording medium more than necessary but also require it to withstand troublesome editing in association with the shots.

SUMMARY OF THE INVENTION

It is therefore an object of the present invention to provide a sound recording system for an electronic still camera which is capable of recording sound throughout a desired period of time inclusive of the instant of taking a shot.

It is another object of the present invention to provide a system which is capable of recording sound over a relatively long period of time without the need for a large-capacity IC memory for time-axis compression, by positively utilizing a time-axis conversion function which is advantageously present in conjunction with the use of a magnetic disc. In other words, the function of variably companding the time axis to the rotation timing of a magnetic disc.

In order to achieve these objects, a sound recording method in accordance with the present invention, which is applied to an electronic still camera for recording signals indicative of still pictures time-serially in a rotary magnetic recording medium, comprises the steps of compressing in time axis an audio signal having a duration equal to a first period of time into an audio signal having a duration equal to a second period of time which is shorter than the first, and writing the compressed audio signal into the recording medium as unit records of data, the time-axis compression and writing steps being repeated to record audio signals in the recording medium as discrete unit record data.

Such a sound recording method may be practiced using a sound recording apparatus for an electronic still camera which records video signals indicative of still pictures time-serially into a rotary magnetic recording medium. The apparatus comprises a time-axis compression circuit for temporarily storing an input audio signal to compress it in the time axis to convert the audio signal having a duration equal to a first period of time into an audio signal having a duration equal to a second period of time which is shorter than the first. The apparatus further includes recording means for recording an output of the time-axis compression circuit into the recording medium, and a control circuit for controlling the time-axis compression circuit and the recording means. The control circuit utilizes the time-axis compressed audio signal of the second period of time as a unit record of data and thus writes consecutive audio signals of the second period of time into discrete blocks in the recording medium in response to the rotation of the recording medium.

Audio signals recorded in the manner described may be reproduced by an audio signal playback apparatus for an electronic still camera which reproduces audio and video from data stored on a rotary magnetic recording medium in which audio signals are recorded in association with video signals indicative of still pictures, the audio signals stored together with the video signals. An audio signal having a duration equal to a first period of time is compressed in time axis into an audio signal having a duration equal to a second period of time, which is shorter than the first, to constitute a unit record of data, consecutive audio signals each being of the second period of time being recording discrete blocks in the recording medium. The apparatus comprises reading means for reading an audio signal out of the recording medium, a time-axis expansion circuit for temporarily storing an audio signal of the second period of time read by said reading means to produce the stored audio signal as an audio signal substantially equal in duration to the first period of time, and a control circuit for controlling the reading means and the time-axis expansion circuit. The control circuit controls the read means such that audio signals read out of the recording medium become stored in the expansion circuit in the sequence of recording of consecutive compressed audio signals of the second period of time in the discrete blocks in the recording medium. The control circuit also controls the expansion circuit such that the stored audio signals become expanded in time axis to continuously produce the audio signals of the first period of time.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Generally, the sound recording system in accordance with the present invention writes time-axis compressed audio signals discretely in an interleave mode onto a rotary magnetic recording medium which, in the form of a disc for example, records still pictures thereon as raster scan video signals. The principles of such a system will now be described.

Figure 1:
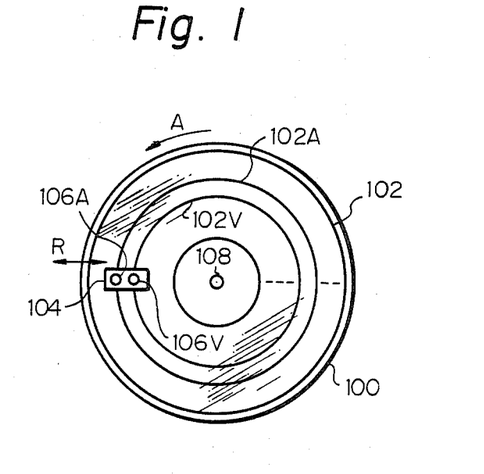
FIGS. 1 and 2 are plan views of a magnetic disc which are useful for understanding principles of a sound recording system for an electronic still camera in accordance with the present invention.

While the description will proceed with specific numerical values, it should be noted that these values are merely to help understand the present invention and are not by way of limitation. As schematically shown in FIG. 1, a magnetic disc 100 exemplifying the rotary magnetic record media is formed with a number of recording tracks 102 in a recording surface thereof. The disc 100 is detachably mounted on a shaft 108 which is operatively connected to a motor 430, FIG. 4. The shaft 108 and thereby the discs 100 is rotated by the motor 430 at a speed of 3,600 rpm in the direction of an arrow A. Disposed above the recording surface of the disc 100 are two magnetic heads or transducers 106A and 106V which are carried by a head support 104. The head support 104 is movable back and forth radially of the disc 100 as indicated by a double-headed arrow R in response to the operation of head transport means, not shown, so that the heads 106A and 106V may seek desired ones of the tracks 102. Here, the head 106A serves to record and playback sound, and head 106V to record and playback pictures.

In this particular example, because the disc 100 rotates at 3,600 rpm, one field (1V) of video signal according to the NTSC standard television (TV) system may be stored in one track 102V on the disc 100 by the video head 106V. If the rotation speed of the disc 100 is 1,800 rpm, two fields, or one frame, of still picture video signals may be recorded in one video track 102V in accordance with the NTSC system.

Audio signals associated with the video signals in the video track 102V will be written into an audio track 102A by the audio head 106A as will be described.

Supposing the rotation speed per second of the disc 100 is N (60 rpm in this example) and the recording frequency is $m_R$, then the storage capacity per track $n_R$ is $M_R/N$. Therefore, where the recording frequency $m_R$ is 12M bits per second for example, the storage capacity $n_R$ is 200K bits per track. It follows that signals should preferably be written into both the tracks 102A and 102V to such a storage capacity.

Suppose that audio signals are sampled at a sampling frequency $f_s$ and encoded into quantizing levels which are represented by $n_q$ bits. Then, the frequency $m_s$ of an audio code is produced by $f_s \times n_q$. For example, where it is intended to record audio signals the bandwidth of which is double the bandwidth of the public telephone line, and if $f_s$ is 16 kHz and $n_q$ is six bits, $m_s$ will be 96K bits per second. The audio track 102A, therefore, is capable of recording audio signals over two seconds. One track 102A stores therein $n_s$ bits (200K bits) of audio signals which are the two-second audio signals (192K bits in this example) plus sync and parity codes.

A charcateristic feature of the present invention resides in that the $n_s$ bits of audio signals are divided into B blocks or sectors and recorded discretely in an interleave mode. Supposing that B is 60, one block of audio signals will be recorded in one track 102A for substantially two rotations of the disc 100, because the disc 100 rotates 2N rotations for each two seconds during which $n_s$ bits of audio signals arrive, i.e. 120 rotations.

The $n_B (=n_R/B)$ recording bits included in one block or sector accommodate $n_q$ bits of data resulting from one sampling and data C including a sync code, parity code and like error control code, to form l words (or bytes). In the above-described example, $n_B$ is 3.3 K bits and, supposing one word comprises six bits, l is 550.

The time period $\tau_B$ required for writing l words in one block is equal to $1/(N.B)$ second and, in the above example, 278 microseconds. Meanwhile, the time period $\tau_S$ necessary for sound to be sampled l times at the sampling frequency $f_s$ is $l/f_s$ second and, in the practical example discussed, 34.4 milliseconds. Therefore where l words of audio signals are written into one block of the audio track 102A to the same density as in the video track and over the time period $\tau_B$, it is after the lapse of the time period $\tau_S$ that the next l words of audio signals may be recorded. Stated another way, audio signals are written into the audio track 102A after being compressed with respect to time axis at a ratio equal to $\tau_B/\tau_S$. During the time period $\tau_S$, the disc 100 rotates $\tau_S/N$ rotations so that $(\tau_S/N) \times B$ blocks move past the audio head 106A. As to the exemplary numerical values concerned, the compression ratio is 1/123.7 and thereby the disc makes 2.06 rotations for the time period $\tau_S = 34.4$ milliseconds moving 123.7 blocks past the audio head 106A. Therefore, audio signals appearing after the time period $\tau_S$ are recorded in a block which will arrive at the audio head 106A when the disc 100 rotates two full rotations and four blocks.

Figure 2:
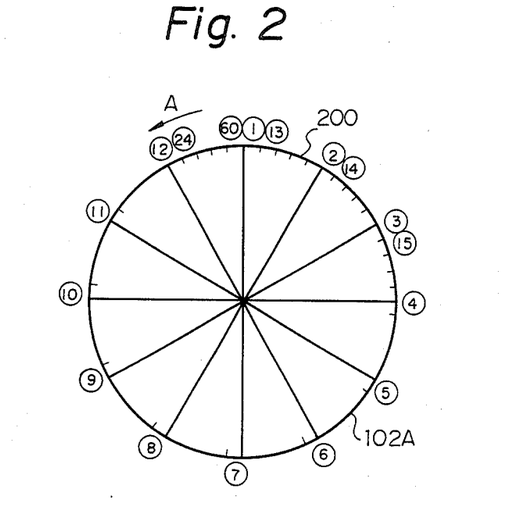
Figure 3:
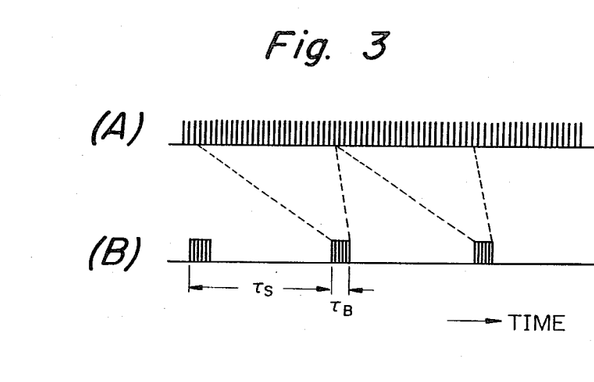
FIG. 3 shows show signal waveforms representing time-axis compression and expansion in accordance with the present invention.

Referring to FIG. 2, there is shown an example of the system in which the audio track 102A is divided into sixty blocks (=B) and 550 samples of 6-bit audio signals are written thereinto every time the disc 100 completes a two rotation plus five block movement. As shown in FIG. 3B, input audio signals are compressed to $\tau_B/\tau_S$ by a suitable time-axis compression circuit, e.g. FIFO circuit 412 shown in FIG. 4. In FIG. 3A, the waveform indicates audio signals sampled at the frequency $f_s$ while in FIG. 3B the waveform indicates compressed audio signals fed to the audio head 106A to be written into the audio track 102A.

In FIG. 2, the audio track 102A is divided into sixty blocks 200 which are shown in groups each comprising five blocks. First, 550 words of compressed audio signal, FIG. 3B, are written into a block #1, which is indicated in FIG. 2 by the number 1 in a circle. Thus audio signal, representing sound sampled over 34.4 milliseconds before that instant, includes 3.3K bits and is sequentially written into the block #1 over 278 microseconds as the disc 100 rotates in the direction designated by an arrow A.

Thereafter, when the disc 100 completes a two rotation plus five block movement in the direction A, that is, upon the lapse of more than 34.4 milliseconds after the end of recording into the block #1, the head 106A becomes located in the next block #2. An audio signal sampled in that while, i.e. 34.4 milliseconds, is written into the block #2 as 550-word, 3.3-K bit compressed data. This also requires 278 microseconds. In the same manner, each time the disc rotates two rotations and five blocks, a compressed audio signal is recorded in each of the remaining blocks #3 to #12.

After the head 102A has recorded a signal in the block #12, the disc 100 makes two rotations and additionally moves over six blocks whereupon the head 102A starts writing a signal into a block #13. When 550 words are fully written into the block #13, the interleave recording procedure will occur for blocks #14 to #24 as in the case of the blocks #2 to #12, each after a two rotation and five block movement of the disc 100.

As all the blocks up to a block #60 move past the head 106A, the head 106A individually stores the audio signals on the disc. An audio signal next received is written over the signal originally sorted in the block #2 which will be positioned below the head 106A by a two rotation and six block movement of the disc 100. The same procedure will be repeated thereafter from the block #3 over to the block #1 via the block #12, each upon a two rotation and five block movement of the disc 100. In this manner, and audio signal produced for the past two seconds before each instant is written into and stored in the audio track 102A.

To store an audio signal whose duration is longer than 2 seconds, two or more of the audio tracks on the disc 100 will be used. In detail, the audio track 106A after filled the block #60 seeks another audio track and starts writing audio signals in the interleave mode from a block #1 of the new track. It will be noted here that the position of the block #1 at which recording is to be started may differ from one track to another, that is, it does not need to be limited relative to those in the other tracks. The time period for seeking another track is not longer than about 10 milliseconds and this may be included in the time period of 34.4 milliseconds, which is required for sampling audio signals 550 times as previously stated.

As described so far, the audio track 102A always stores sound which produced during about the past two seconds. When a release button, not shown, of the camera is depressed under the above condition, one frame (or field) of video signal becomes recorded in a video track 102V associated with the audio track 102A. Even the sound generated after the release may be written into the audio track 102A over a desired period of time; for example, sound produced for two seconds inclusive of the instant of a shot, one second before the shot and one second after the shot. Further, a plurality of audio tracks are available for recording audio signals of a desired duration inclusive of the instant of a shot, e.g. four seconds, in association with recording of a still picture. While a single audio head 106A has been shown and described as being movable to seek audio tracks one after another, use may be made of a plurality of audio heads which seek a plurality of audio tracks in advance and are sequentially switched from one to another to continuously write audio signals into the tracks.

The sound recording system described hereinabove may be practiced with a sound recording apparatus shown in FIG. 4 and a sound playback apparatus shown in FIG. 5. The recording apparatus is adapted to record sound together with still pictures while the playback apparatus is adapted to reproduce the recorded sound together with the still pictures.

Figure 4:
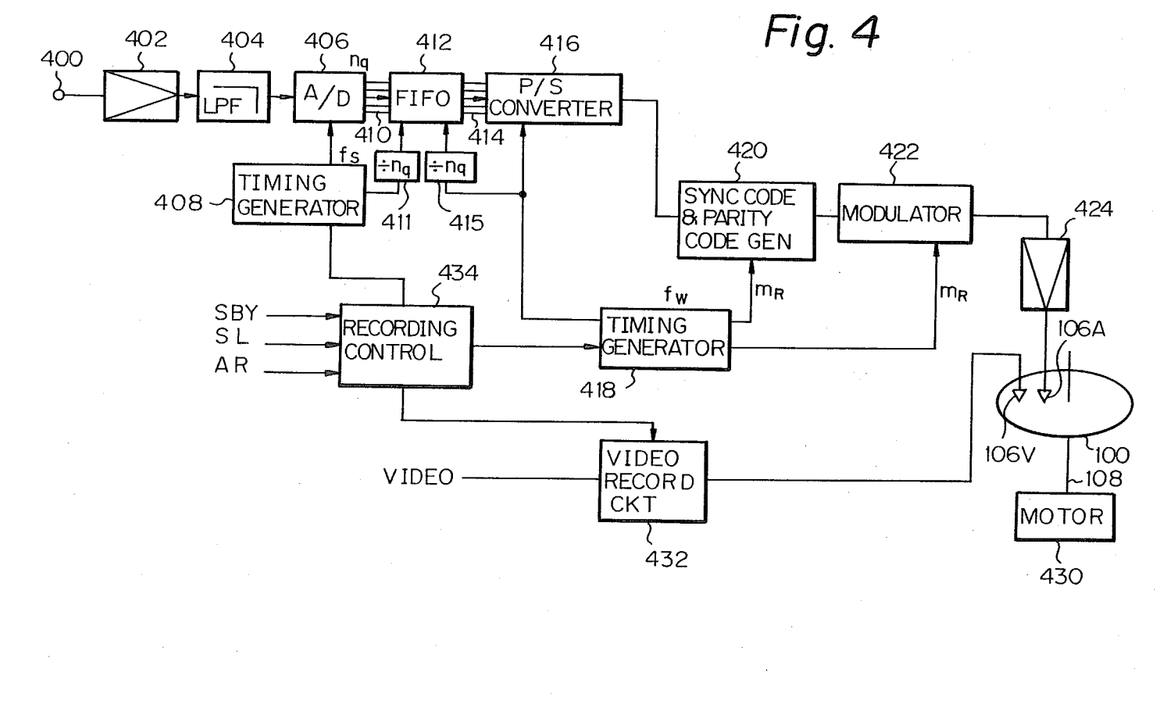
FIG. 4 is a schematic block diagram showing a sound recording apparatus for practicing the system of the present invention.

Referring to FIG. 4, sound coming in through a microphone 400 is transformed into an electric signal. An amplifier 402 amplifies the electric signal to supply a low pass filter (LPF) 404 with an output thereof. The LPF 404, in this particular embodiment, cuts off high frequency components of the audio signal over 8 kHz. The filtered signal is fed to an analog-to-digital (A/D) converter 406.

The A/D converter 406 samples and quantizes the input audio signal in response to a sampling frequency $f_s$ which is supplied thereto from a conversion timing generator 408. The illustrated embodiment employs a sampling frequency $f_s$ of 16 kHz, 64 quantizing levels and, outputs 410 of the A/D converter 40 including six ($=n_q$) bit parallel outputs. The signal waveform appearing on one of the outputs 410 is illustrated in FIG. 3A.

The parallel outputs 410 of the A/D converter 406 are coupled to a buffer memory 412 which is also supplied with the clock $f_s$. The clock $f_s$ from the timing generator 408 is divided by $n_q$ before reaching the buffer memory 412. The buffer memory 412 is a first-in-first-out (FIFO) circuit for time-axis compression, whereby audio signals input at a low rate are output intermittently at a high rate. This will give continuity to audio signals in adjacent blocks during interleave recording. A capacity selected for the FIFO memory 412 in this embodiment is on the order of 4.1 K bits which is, as previously stated, the result of addition of some margin to the 3.4K bits entering for a period $\tau_S$, FIG. 3, at which audio signals undergone time-axis compression will be written into the blocks. The margin will suffice if on the order of 1K bits, taking into consideration the seek time required for the audio head 102A. The clock rate for the audio signals to be provided in parallel into the FIFO 412 and stored therein may be $f_s/n_q$ which is produced by a frequency divider 411.

As already discussed, the time intervals for reading time-axis compressed audio signals out of the FIFO memory 412 are the time period $\tau_S$, FIG. 3, for which the disc 100 will rotate twice and read five to six blocks. The time period $\tau_S$, therefore, is not constant but variable. Also, the number of words to be written into one block is variable over a narrow range.

Parallel outputs 414 of the FIFO memory 412 are coupled to a parallel-to-serial converter 416. A record timing generator 418 supplies both the FIFO memory 412 and parallel-to-serial converter 416 with a write frequency $f_w$ which, in this embodiment, is 12 MHz and equal to the frequency for writing video signals into the video tracks 102V on the disc 100. Here, the clock for reading compressed audio signals out of the FIFO memory 412 has a frequency which may be $f_w/n_q$ produced from a frequency divider 415. The parallel audio signals read out of the FIFO memory 412 are converted by the parallel-to-serial converter 416 into a serial (bit serial) signal which is then gated into a synchronous code and parity code generator circuit 420. The serial signal with a sync signal and a partiy code added thereto is fed to a record modulation circuit 422.

The FIFO memory 412 may be provided with a serial-input, serial-output design, instead of the illustrated parallel-input, parallel-output design. With such an alternative design of the FIFO memory 412, the A/D converter 406 will serially produce quantized audio signals, the parallel-to-serial converter 416 will be omitted, and the input and output clock frequencies for the FIFO memory 412 will be 16 kHz and 12 MHz respectively.

For a simpler construction, the time-axis compression system including the A/D converter 406, FIFO memory 412 and parallel-to-serial converter 416 may be constructed to band-compress input signals employing the delta (Δ) modulation, difference pulse code modulation (DPCM) or like modulation system. In such a case, further higherrate clocks will be supplied by the individual timing generators 408 and 418.

The modulator 422 modulates the input serial signal in the frequency modulation (FM), for example. The output of the modulator 422 is fed via a record amplifier 424 to the audio head 106A to be written into an audio track 102A on the disc 100 in a digital form. This type of digital recording will cancel any old signal in an audio track by simply writing a new audio signal over the old audio signal, instead of using an erase head or like additional head.

Meanwhile, a video signal VIDEO is fed to the video head 106V by way of a video record circuit 432 to thereby be written into a video track 102V associated with the audio track 102A. A recording control circuit 434 is adapted to interlink the sound and image recording operations to the operation of an electronic camera, while controlling over the total system operations. In detail, the recording control 434 controls the timing generators 408 and 418, video record circuit 432 and others in response to a standby signal SBY, a shutter release signal SL and a postrecord signal AR, thereby controlling the interleaved recording procedure previously described with reference to FIG. 2.

To take a shot with an electronic camera, a standby button, not shown, is depressed first thereby starting up the sound recording apparatus. This drives a motor 430 into rotation and energizes the timing generators 408 and 418 so that sound coming in through the microphone 408 is subjected to time-axis compression to then be written into an audio track 102A by the interleave mode. As soon as a release button, not shown, of the camera is depressed, a release signal SL is applied to the recording control 434 which then energizes the video recording circuit 432. As a result, one frame (or field) of video signal is written into a video track 102V which is associated with the audio track 102A.

The record control 434 counts time after the arrival of the SL signal and, upon the lapse of a predetermined time (e.g. one second), deenergizes the conversion timing generator 408 to stop the entry of audio signals into the FIFO 412. As an audio signal picked up for the predetermined time, i.e., for one second after the shot in this embodiment, is fully written into the audio track 102A, a mark for identification is entered at the trailing end of the block which has stored the latest audio signal. The mark is adapted for the identification of an end or start point of audio signal recording in the audio track 102A, and will be utilized by the sound playback apparatus.

While the recording operation has been described as being terminated automatically by the recording control 434 which counts a predetermined time, it will be seen that the camera may be provided with an end-of-record button, not shown, accessible to the operator.

For postrecording sound, a postrecord button, not shown, will be depressed to actuate the sound recording section only to thereby exclusively record sound in the interleave recording.

Figure 5:
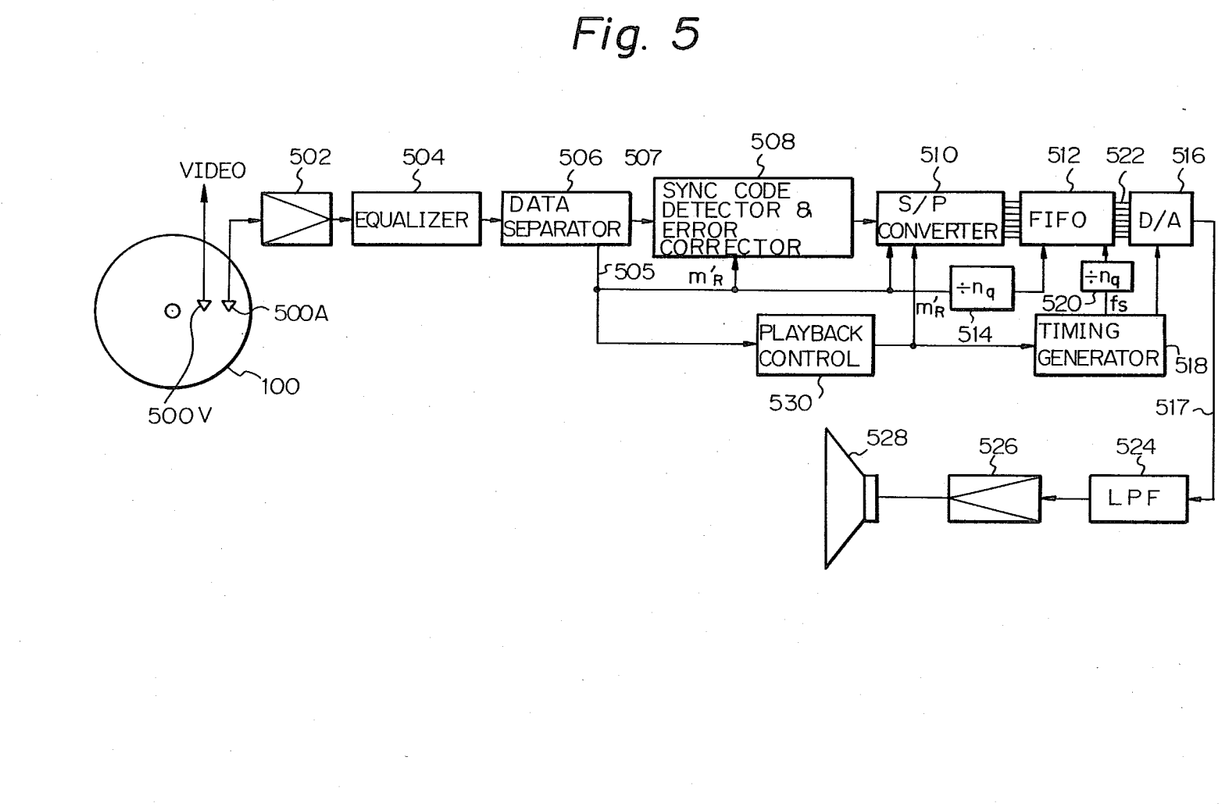
FIG. 5 is a schematic block diagram of a sound playback apparatus for reproducing sound which is recorded by the apparatus shown in FIG. 4.

The sound playback apparatus shown in FIG. 5 is capable of reproducing the audio signals out of the disc 100 together with pictures associated therewith. During playback, the disc 100 is rotated substantially at the same speed as during recording. A video head 500V and an audio head 500A are moved above and relative to the video track 102V and an audio track 102A, respectively. The heads 500V and 500A, which are magnetic playback heads, may be constructed similarly to those of the recording apparatus of FIG. 4, not to speak of the motor and disc support shaft. Further, the playback apparatus of FIG. 5 may share the heads, motor and the like with the recording apparatus of FIG. 4 in order to constitute a combined sound recording and playback arragement.

In any case, the video signal VIDEO picked up by the video head 500V out of the video track 102V may be repeatedly reproduced by a video playback system, not shown, as one frame (or field) of video signal in response to the rotation of the disc 100. Then, the video signal will appear as a still picture on a CRT or like display.

The audio signal read by the audio playback head 500A out of the audio track 102A, which is associated with the video track 102V, is passed through a preamplifier 502 to an equalizer 504. The equalizer 504 functions to compensate for and equalize the input signal with respect to the magnetic recording characteristics particular to the disc 100. The output of the equalizer 504 is demodulated by a demodulator circuit or data separator 506, whereby a clock 505 ($m_R'$) is recovered from the audio signal.

The data separator 506 connects to a synchronous code detector and error corrector 508 which is adapted for sync recovery and error control for an audio signal 507 developed from the data separator 506. The output of the synchronous code detector and error corrector 508 is fed to a serial-to-parallel converter 510. The audio signal thus read out of the audio track 102A on the disc 100 and demodulated have been compressed with respect to time axis as illustrated in FIG. 3B.

The serial-to-parallel converter 510 processes the compressed audio signal into parallel signals, which are, in turn, temporarily stored in a FIFO memory circuit 512. The synchronous code detector and error corrector 508 and serial-to-parallel converter 510 are individually supplied with the clock 505 ($m_R'$) separated from the audio signal by the data separator 506, while the FIFO circuit 512 is supplied with a clock prepared from counting down the clock 505 by a frequency divider 514, i.e. $m_R'/n_q$. In this particular embodiment, the frequency of the clock $m_R'$ is substantially 12 MHz.

Constructed substantially in the same way as the FIFO memory 412 of FIG. 4, the FIFO circuit 512 of FIG. 5 serves to expand audio signals with respect to time axis. Another function of the FIFO circuit 512 is that of a buffer memory which gives continuity to audio signals stored in adjacent blocks in the audio track 102A during playback. The audio signals intermittently fed from the converter 510 at a relatively high frequency $m_R'n_q$ as shown in FIG. 3B, and is delivered therefrom to a digital-to-analog (D/A) converter 516 in response to a clock having a relatively low frequency $f_s$ and in a continuous manner, as shown in FIG. 3A. The frequency of this read clock $f_s$ may be prepared by dividing the frequency $f_s$ equal to the sampling frequency of the FIG. 4 apparatus by $n_q$ at a frequency divider 520. Such a read clock is supplied by a conversion timing generator 518. The read clock is also fed to the D/A converter 516 and, in this embodiment, it has a frequency of 16 kHz.

The D/A converter 516 processes compressed parallel audio signals appearing at an output 522 of the FIFO circuit 512 into analog waveforms which are associated with the quantizing levels. The output of the D/A converter 516, which is an audio signal in the base band, is delivered to a low pass filter (LPF) 524 to be cleared of high frequency noise. The resulting signal is passed through an output amplifier 526 to a loudspeaker 528 to be reproduced thereby as audible sound.

The operation of the whole playback apparatus is controlled by a playback control circuit 530. Supplied with the clock 505 from the data separator 56, the playback control 530 is capable of detecting the identification mark recorded by the apparatus of FIG. 4 in the aduio track 102A and indicative of an end or start point of audio signal recording in the audio track 102A. The instant that the control 530 detects the mark in the audio signal read out of the audio track 102A, it enables the serial-to-parallel converter 510 and timing generator 518 to start a time-axis expansion and thereby sound reproduction. That is, the control 530 starts to read audio signals from a block which is located five to six blocks past of the specific block identified by the mark with respect to the rotating direction of the disc 100, sequentially storing the signals in the FIFO circuit 512 in the same order and timing as during recording. It will thus be seen that after reading an audio signal out of one block to store it in the FIFO circuit 512, the control 530 reads an audio signal out of the disc 100 to store it in the FIFO circuit 512 each time the disc 100 moves two rotations and five to six blocks. In the meantime, the audio signals stored in the FIFO circuit 512 are fed to an output 517 continuously in the sequence of storage and each after time-axis expansion.

In the manner described above, all the sound stored in the audio track 102A can be reproduced with continuity from the oldest sound over to the newest sound. The playback apparatus, therefore, can reproduce an audio signal together with its associated video signal repeatedly whenever desired.

Thus, utilizing the time conversion function of a magnetic disc, the embodiment shown and described implements a sound recording system which is capable of recording even a relatively long duration of sound without the need for a large capacity IC memory for time-axis compression.

In summary, it will be seen that the present invention provides a sound recording system for an electronic still camera which is enabled to record sound which was produced before a shot in association with the image field. More specifically, sound can be recorded for any desired period of time starting from an instant a given time before the instant of depression of a release button. One may listen to the sound associated with a picture during playback of the latter, or repeatedly have the sound reproduced for a desired period of time.

Various modifications will become possible for those skilled in the art after receiving the teachings of the present disclosure without departing from the scope thereof.

What is claimed is:

1. A method of recording an audio signal associated with a contemporaneously captured video still image on a track of a magnetic disc having a plurality of tracks, comprising:

initiating recording of said audio signal on a track of said magnetic disc;

continuing recording said audio signal on said track of said disc for any desired time period, said step of continuing recording including recording said audio signal over the oldest recorded portions of said track of said magnetic disc after said track has been completely recorded on to form an audio signal recording of a first predetermined time duration;

capturing said video image; and stopping said recording of said audio signal a second predetermined time duration after said video image is captured, which second predetermined time duration is substantially less than said first predetermined time duration to form said audio signal of said first predetermined time duration, wherein each of said plurality of tracks of said magnetic disc is divided into a plurality of blocks, said steps of initiating and continuing recording said audio signal comprise the step of recording said audio signal as discrete unit records of data in each block of said track.

2. A system for recording an audio signal associated with a contemporaneously captured video still image on a track of a magnetic disc having a plurality of tracks, comprising:

audio recording means for recording said audio signal on a track of said disc, said audio recording means initiating recording on said track of said magnetic disc and continuing recording said audio signal over the oldest recorded portions of said track of said magnetic disc after said track has been completely recorded on to continuously produce an audio signal recording of a first predetermined time duration;

still picture development means for recording said video image; and means, responsive to the recording of said video image by said still picture development means, for stopping the recording of said audio signal by said audio recording means a second predetermined time duration after said video image is recorded, said second predetermined time duration being less than said first predetermined time duration to form an audio signal of said first predetermined time duration, wherein each of said plurality of tracks of said magnetic disc is divided into a plurality of blocks, said audio recording means including means for recording said audio signal as discrete units of record data in each block of said track.

3. A sound recording method for an electronic still camera which records video signals indicative of still pictures time-serially on a magnetic disc having a plurality of tracks, each track being divided into a plurality of blocks, said method comprising the steps of:

receiving audio signals sensed inclusive of the instant when said camera picks up the video signals;

compressing in time axis an audio signal having a duration equal to a first period of time into an audio signal having a duration equal to a second period of time which is shorter than the first period of time; and writing the compressed audio signal onto a track of the magnetic disc in the form of a unit record of data;

said time-axis compression and writing steps being repeated at a time interval which is substantially equal to the first period of time;

said writing step comprising the step of recording the compressed audio signals in the form of discrete unit records of data in a plurality of blocks of said track of the magnetic disc;

each of said unit records of data being spaced from the immediately preceding said unit record of data by a distance equal to a difference between the first period of time and a nonzero integral multiple of a period for which the magnetic disc completes one rotation, multiplied by the rotational speed of the disc; and writing each new one of the compressed audio signals, after a first predetermined number of unit records of data have been recorded, over an old previously recorded unit record of data to record audio information sensed inclusive of the instant of picking up said video signal.

4. A method in accordance with claim 3, wherein said compressing step comprises the step of varying the first period of time so that audio signals are ultimately written into all of said blocks which re included in a single track, in response to the rotation of the disc.

5. A method inaccordance with claim 3, wherein said writing step comprises the steps of converting audio signals into associated digital signals, and writing the digital signals onto the magnetic disc.

6. A method in accordance with claim 5, further comprising the step of recording, when recording of audio signals is finished, an identification mark representative of an end of said audio signals in association with one of the blocks into which the latest audio signal is written.

7. A method in accordance with claim 3, wherein said writing step comprises the step of recording on at least one track on the magnetic disc associated with a track for recording the video signals, the audio signals which appear for duration inclusive of an instant of picking up a video signal.

8. A method in accordance with claim 3, wherein said writing step comprises the step of generating a recording frequency for the audio signals which is substantially equal to a recording frequency for the video signals.

9. A sound recording apparatus for an electronic still camera which records video signals indicative of still pictures time-serially on a magnetic disc having a plurality of tracks each being divided into a plurality of blocks, said apparatus comprising:

a time-axis compression circuit for temporarily storing an input first audio signal having a duration equal to a first period of time and for time axis compressing the first audio signal into a second audio signal having a duration equal to a second period of time which is shorter than the first period of time;

recording means for recording an output of said time-axis compression circuit onto a track of the magnetic disc; and control circuit means for controlling the time-axis compression circuit and the recording means, said control circuit means controlling said compression circuit and recording means to configure the time-axis compressed audio signal of the second period of time in the form of a unit record of data, said recording means writing consecutive audio signals for a duration inclusive of an instant of picking up a video signal, each of said consecutive audio signals being of the second period of time and forming a discrete record unit of data stored in a block of said track of the magnetic disc in response to the rotation of the magnetic disc;

the control circuit means comprising timing control means for enabling the recording means to write outputs of the compression circuit onto the track of the magnetic disc at intervals each being equal to the first period of time, said timing control means controlling said compression circuit and recording means to record audio signals in such a manner that adjacent ones of the blocks for discretely recording consecutive audio signals of the second time period are spaced apart from each other on the track of the magnetic disc by a distance corresponding to a difference between the first period of time and a nonzero integral multiple of a period for which the magnetic disc completes one rotation, multiplied by the rotational speed of the disc;

said control circuit means controlling said recording means to record a new one of the compressed audio signals over an old one of said compressed audio signals previously recorded to record audio information sensed inclusive of the instant of picking up said video signal.

10. An apparatus in accordance with claim 9, wherein said control circuit means controls said compression circuit and recording means to vary the first period of time so that audio signals are ultimately written into all the blocks which are included in one track, in response to the rotation of the disc.

11. An apparatus in accordance with claim 9, wherein said recording means writes audio signals into the magnetic disc in a digital form with new audio signals being recorded over the oldest said audio signals recorded on said track.

12. An apparatus in accordance with claim 11, wherein said control circuit means controls said recording means to record, when recording of audio signals is finished, an identification mark representative of an end of said audio signals in association with one of the blocks into which the latest said audio signal is written.

13. An apparatus in accordance with claim 9, wherein said control circuit means controls said compression circuit and recording means to record on at least one track on the magnetic disc associated with a track for recording the video signals, the audio signals which appear for a duration inclusive of an instant of picking up a video signal.

14. An apparatus in accordance with claim 9, wherein said recording means records the audio signals at a recording frequency which is substantially equal to a recording frequency for the video signals.

15. A sound playback apparatus for an electronic still camera for reproducing audio signals from a magnetic disc having a plurality of tracks, each track being divided into a plurality of blocks, in which audio signals are recorded in association with video signals indicative of still pictures, wherein each said audio signal has a real time duration equal to a first period of time but being compressed in time axis into an audio signal having a duration equal to a second period of time, which is shorter than the first period of time, to form a unit record of data, consecutive audio signals being developed for a real time duration inclusive of an instant of picking up a video signal, each of said unit records of data of the second period of time being recorded in discrete blocks on a track of the magnetic disc, audio signals being written onto the track of the magnetic disc in a digital form with the newest said audio signals being recorded, after a predetermined time, over the oldest said audio signal, an identification mark representative of an end of the audio signals being recorded between the oldest and newest said audio signals for distinguishing therebetween;

said sound playback apparatus comprising:

reading means for reading an audio signal out of the magnetic disc;

time-axis expansion circuit means for temporarily storing an audio signal of the second period of time read by said reading means, and for converting the stored audio signal into an audio signal substantially equal in duration to the first period of time; and control circuit means for controlling the reading means and the time-axis expansion circuit means, said control circuit means controlling the reading means such that audio signals read out of the magnetic disc are stored in the expansion circuit means in the sequence of recording of the consecutive compressed audio signals of the second period of time in said discrete blocks in the magnetic disc, said control circuit means controlling the expansion circuit means such that the stored audio signals are expanded in time axis to continuously produce audio signals of the first period of time.

16. An apparatus in accordance with claim 15, wherein a recording frequency for the audio signals is substantially equal to a recording frequency for the video signals.

* * * * *